United States Patent [19]

Forest et al.

[11] Patent Number: 4,508,737

[45] Date of Patent: Apr. 2, 1985

[54] METHOD FOR PRESERVING SILAGE AND RELATED COMPOSITIONS

[75] Inventors: Joseph G. Forest, Waverly; Edward J. Czarnetzky, Chazy, both of N.Y.

[73] Assignee: International Stock Food Corporation, Waverly, N.Y.

[21] Appl. No.: 551,518

[22] Filed: Nov. 16, 1983

Related U.S. Application Data

[63] Continuation of Ser. No. 344,693, Feb. 1, 1982, abandoned, which is a continuation of Ser. No. 233,261, Feb. 10, 1981, abandoned, which is a continuation of Ser. No. 116,730, Jan. 30, 1980, abandoned, which is a continuation of Ser. No. 852,645, Nov. 18, 1977, abandoned.

[51] Int. Cl.$^3$ .............................................. A23K 1/00
[52] U.S. Cl. .................................... 426/54; 426/335; 426/532; 426/623; 426/635; 426/807
[58] Field of Search .............. 426/54, 53, 52, 49, 426/69, 335, 532, 623, 635, 807

[56] References Cited

U.S. PATENT DOCUMENTS

| | | | |
|---|---|---|---|
| 2,799,583 | 7/1957 | Harris | 426/69 |
| 3,033,685 | 5/1962 | Hollenbeck et al. | 426/53 |
| 3,169,068 | 2/1965 | Bloch | 426/541 |
| 3,184,314 | 5/1965 | Forest et al. | 426/64 X |
| 3,284,212 | 11/1966 | Tribble et al. | 426/64 |

OTHER PUBLICATIONS

Rose et al., "The Condensed Chemical Dictionary" 7th Edition, Van Nostrand Reinhold Publishers (1970), pp. 876–877.

*Primary Examiner*—R. B. Penland
*Attorney, Agent, or Firm*—Sughrue, Mion, Zinn, Macpeak, and Seas

[57] ABSTRACT

A method for preserving and controlling the fermentation of silages and high moisture content grains, for example, high moisture content corn and corn silage, by adding to the silage or grain an amount of an alkali metal sulfite, bisulfite, metabisulfite or mixtures thereof sufficient to rapidly create a substantially anaerobic atmosphere in the silage, but insufficient of itself to provide a substantial bactericidal effect in the silage or grain. The alkali metal sulfite, bisulfite or metabisulfite is preferably added to the silage, together with an alkali metal sulfate and an amylolytic enzyme, preferably malt diastase or any of the following: alpha amylase, beta amylase or amylase from aspergillus oryzae.

8 Claims, No Drawings

METHOD FOR PRESERVING SILAGE AND RELATED COMPOSITIONS

This application is a continuation of application Ser. No. 344,693, filed Feb. 1, 1982, which is a continuation of Ser. No. 233,261 filed Feb. 10, 1981, which in turn is a continuation of Ser. No. 116,730 filed Jan. 30, 1980, which in turn is a continuation of Ser. No. 852,645 filed Nov. 18, 1977, all now abandoned.

BACKGROUND OF THE INVENTION

1. Field of the Invention

The invention relates to the preservation of high moisture content grains and silages, the enhancement and direction of the silage or grain fermentation process, and to compositions useful in such processes.

2. Description of the Prior Art

The use of sulfite containing additives to preserve food by scavenging oxygen has long been known as described in various issued patents e.g., U.S. Pat. Nos. 2,799,583, Harris; 2,825,651, Loo et al; 3,169,068, Block; and 3,284,212, Tribble.

Prior art users of sodium metabisulfite for silage preservation purposes, such as is described in the above-noted Harris patent, have primarily been concerned with the removal of oxygen to inhibit spoilage based on the growth of oxygen-dependent mold or bacteria, and on the creation of an antibacterial substrate.

Harris describes a process for the preservation of silage by the addition of an alkaline metabisulfite and urea. The urea is present to control the corrosivity of the metabisulfites toward ferrous metals used in the construction of silos. The proportion of metabisulfite is said, by Harris, not to be critical and is said to vary from about 0.1 to 1.0%, by weight, or from 2–200 lbs/ton of silage. In such relatively high proportions, the metabisulfite has a strong antibacterial effect on the silage and destroys much of the natural bacteria required for desired fermentation. On the contrary, as will be described more fully below, the process and compositions of this invention produce a rapid anaerobic effect, and then, after chemical conversion of the alkali metal sulfite, bisulfite or metabisulfite to sulfate, serve to direct the fermentation.

In our prior U.S. Pat. No. 3,184,314, we have also described the preserving and controlling the fermentation of high moisture content grain silages and by the use of compositions comprising (a) an alkali or alkaline earth metal sulfate salt, and (b) an amylolytic enzyme, preferably malt diastase.

We have now found that we can provide superior, fast acting preservation of and fermentation control for various silages and stored grains, especially high moisture content grains, by use of the compositions of this invention.

SUMMARY OF THE INVENTION

The invention relates to the preservation and fermentation control (in the sense of directing the course of the fermentation) of various silages and stored grains, especially high moisture materials, such as high moisture content corn.

In order to provide palatable silage and grain free from tastes or odors which would discourage feeding and still retaining a high proportion of nutrient and vitamin values, it has been found to be essential to stop undesired mold and bacterial growth as quickly as possible, while at the same time directing the fermentation so that the formation of propionic acid is promoted.

The present composition achieves this dual result in a uniquely effective way by adding to the silage or grain from about 0.2 to less than 2 lbs/ton of silage or grain of an alkali metal sulfite, bisulfite, metabisulfite or mixtures thereof. If the amount is below about 0.05 lbs/ton, the effect is inadequate to produce the desired anaerobic effect. If the amount exceeds 2.0 lbs/ton, a strong antibacterial effect is produced in the silage with the destruction of natural bacteria essential to proper fermentation and so the conditions for natural fermentation are lost. Sulfite amounts at the lower end of the range have been found particularly effective with sulfite amounts of 0.2 to 1.5 lbs/ton silage preferred and 0.2 to 0.8 lbs/ton silage particularly preferred.

While the method of the invention may be practiced solely using alkali metal sulfite, bisulfite, metabisulfite or mixtures thereof, the best results are obtained by using compositions comprising such compounds together with other additives.

The preferred compositions of the present invention comprise the following ingredients in the indicated amounts:

| Constituent | Amount |
| --- | --- |
| (a) alkali metal or alkaline earth metal sulfite, bi-sulfite or metabisulfite | 0.2 to less than 2 lbs/ton silage |
| (b) alkali metal or alkaline earth metal sulfate | 0.5 to 2 lbs/ton of silage |
| (c) amylolytic enzyme, preferably malt diastase | 0.02 to 5 lbs/ton of silage |

The compositions may be mixed with silage in any known manner, as for example, by preparing an aqueous solution or dispersion of the ingredients and spraying solution or dry granules on the silage while agitating the silage mass to effect thorough coverage.

The compositions are particularly effective on high moisture content corn and other high moisture grains. A high moisture content corn or grain is generally a corn or grain containing from about 18–35%, by weight, of moisture.

DETAILED DESCRIPTION OF THE INVENTION

We have discovered that the use of certain effective amounts of alkali metal sulfite, bisulfite, metabisulfite or mixtures thereof permit both effective proportion of the silages of corn, grass, hay, and the like and high moisture content corn and grains from the effects of the growth of aerobic molds, and also contributes to the desired control of the silage fermentation. Effective amounts of the alkali metal sulfite, bisulfite or metabisulfite are from about 0.2 to less than 2 lbs/ton of silage, preferably 0.2 to 1.5 lbs/ton silage, most preferably 0.2 to 0.8 lbs/ton silage.

The function of the alkali metal sulfite, bisulfite or metabisulfite, sodium metabisulfite being preferred is two-fold. It acts as a precursor of sodium sulfate which acts to control fermentation by favoring the production of a preponderance of propionic acid and disfavoring the co-production of butyric acid, both of which are secondary products of lactic acid which is the first byproduct of the fermentation cycle. At the same time, it acts quickly to remove oxygen entrapped in spaces between feed particles so that a substantially anaerobic environment is rapidly formed. The anaerobic environment not only favors the conversion of lactic to propionic acid but also prevents the growth of aerobic molds which are undesirable in feed. With the presence of the oxygen scavenging alkali metal sulfite, bisulfite or metabisulfite, the oxygen is tied up as a sulfate in an exothermic reaction, and the desirable fermentation proceeds rapidly without mold, toxins, or excessive heat formation, and with the production of a preponderance of desirable fermentation products.

For maximum advantage to be taken of the process, the alkali metal sulfite, bisulfite or metabisulfite should be applied to the silage with additional sodium sulfate, and preferably with an amylolytic enzyme, such as malt diastase, or any of alpha amylase, beta amylase or amylase from aspergillus oryzae. Other additives, such as a surfactant and food grade acids, formic acid or formalin may also be added to the grain or silage. Any suitable non-toxic surfactant, preferably dimethyl polysiloxane to help wetting and spreading of the composition throughout the silage is satisfactory. Anionic, cationic, amphoteric, and non-ionic surfactants have all proved useful. Examples of suitable surfactants which may be used include, but are not limited to, sodium alkylsulfonethanolamine, dimethylpolysiloxane ammonium alkylarylpolyethersulfonate, sodium alkylarylpolyethersulfonate, sulfonated fatty acids and lignin sulfonate and its salts.

In achieving fermentation control is silages and high moisture grains, an important advantage of the invention is that it avoids the usual delay of from about 28–48 hours for silages and grains to become anaerobic. In this delay period, some molds may grow and undesirable fermentation may proceed. With the present method and compositions, however, an anaerobic state is rapidly reached and a higher proportion of the plant material is converted to desirable silage.

EXAMPLE I

Under controlled conditions, a first batch of 67% moisture corn silage was mixed at 70° F. with a mixture of 96% sodium sulfate and 3% malt diastase. The mixture was added in an amount of about 1½ lbs/ton of corn silage.

A second batch of silage was treated in the same fashion as the first, but 0.3 lbs of sodium sulfite per ton of silage was also added, and replaced 0.3 lbs of sodium sulfate.

The production of lactic acid and propionic acid and the presence of mold were monitored after 48 hours in each batch.

The results were as follows:

|  | Lactic Acid | Propionic Acid | Mold Count |
| --- | --- | --- | --- |
| Batch #1 | 0.3% | 0.05% | 180,000/Gm (70,000/Gm-96 hours) |
| Batch #2 | 1.1% | 0.3% | 1,600/Gm (40/Gm-96 hours) |

EXAMPLE II

Batches of 30% high moisture corn were treated in the same manner as was the corn silage in Example I. Mold was monitored at the end of 5 days and at the end of 30 days. Chemical analyses were made at the end of 30 days. Batch #3 contained no sulfite while Batch #4 contained the sodium sulfite.

|  | Acetic Acid | Butyric Acid | Propionic Acid | Mold (30 days) | Mold (5 days) |
| --- | --- | --- | --- | --- | --- |
| Batch #3 | 0.4% | 0.1% | 0.15% | +1* | +1* |
| Batch #4 | 0.2% | 0.01% | 0.4%** | 0** | +−*** |

*+1 = 10,000 to 25,000 mold spores
**0 = no mold
***+− = less than 10,000 mold spores With use of the compositions of the present invention there was no mold present at the end of 30 days of ensiling, and very little mold at the end of 5 days under the conditions of this experiment.

Oxygen was not present in Batch #4 at the end of a 24 hour period, whereas it was present in Batch #3 after 24 hours of fermentation.

Fresh untreated silage ordinarily exhibits a mold count of 50,000/gm which rises to 250,000 in 4 hours and remains at that level after 96 hours. With the compositions of the present invention, a rapid reduction in mold count is realized after between 48 and 96 hours. This indicates that little, if any, mold toxin will be produced when following the teachings of this invention.

The much higher levels of lactic and propionic acids indicate superior progress of the fermentation process in the direction desired to produce more palatable and nutritious silage.

In general, the compositions of the invention comprising 10 to 97% of any of the inorganic sulfates, such as sodium sulfate, potassium sulfate, magnesium or ammonium sulfate, 0.3 to 3% amylolytic enzyme and 2 to 20% alkali metal sulfite, bisulfite and metabisulfite should be used on silage at a rate of about 0.3 to 5 lbs/ton, thus maintaining the effective amount of the sulfite per ton of silage in the ranges discussed above.

While former experimenters used sodium sulfite or metabisulfite by itself, they used too high a concentration in an effort to kill all the organisms in silage and thereby tended to kill much or all of the lactic acid and propionic acid producing bacteria, as well as the yeasts and molds. This left the silage in a state harder to digest and with no biosynthesis from fermentation and no preparation of the cells and cell cementum to become absorptive and save the all-important silage juices with their proteins and vitamins.

What is claimed is:

1. A process for preserving and controlling the fermentation of silages and high moisture content grains comprising mixing with fresh silages and/or grains a composition comprising a compound selected from the group consisting of alkali metal sulfite, alkali metal bisulfite, alkali metal metabisulfite or mixtures thereof, said compound being present in the resulting silage and/or grain mixture in an amount of 0.2 to 1.5 lbs/ton silage and sufficient to provide a substantially anaerobic atmosphere in the silage and/or grain, said amount being insufficient to destroy substantial amounts of the natural bacteria which are present in the fresh silage and/or grain and which take part in fermentation.

2. The method of claim 1, wherein the amount of said compound is 0.2 to 0.8 lbs/ton silage.

3. The method of claim 1, wherein said composition further comprises sodium sulfate.

4. The method of claim 3, wherein said composition further comprises an amylolytic enzyme.

5. The method of claim 4, wherein said amylolytic enzyme is malt diastase.

6. The method of claim 1, wherein the amount of said compound is 0.2 to 1.5 pounds per ton of silage.

7. A composition which, when applied to silages and high moisture content grains at the rate of from about 0.3-5 lbs/ton, preserves said silage from aerobic mold growth and promotes fermentation with the formation of lactic acid and the conversion of said lactic acid to propionic acid, comprising from 10-97% or an inorganic sulfate selected from the group consisting of sodium sulfate, potassium sulfate, magnesium sulfate and ammonium sulfate, from 0.3-3% of an amylolytic enzyme, and from 2-20% of a compound selected from the group consisting of alkali metal sulfite, alkali metal bisulfite, alkali metal metabisulfite and mixtures thereof.

8. The composition of claim 7, wherein said amylolytic enzyme is malt diastase.

* * * * *

UNITED STATES PATENT AND TRADEMARK OFFICE
CERTIFICATE OF CORRECTION

PATENT NO. : 4,508,737

DATED : April 2, 1985

INVENTOR(S) : Joseph G. Forest and Edward J. Czarnetzky

It is certified that error appears in the above-identified patent and that said Letters Patent is hereby corrected as shown below:

Column 2, line 50, delete "proportion" and insert --protection--.

Column 3, line 29, delete "is" and insert --in--.

Column 5, line 4, delete "0.2" and insert --0.3--;

line 10, delete "or" and insert --of--.

*Signed and Sealed this*

*Twenty-fourth* Day of *September 1985*

[SEAL]

*Attest:*

DONALD J. QUIGG

*Attesting Officer*

*Commissioner of Patents and Trademarks—Designate*